July 6, 1937.　　　P. PAYETTE　　　2,086,091
VEHICLE BODY
Filed Oct. 5, 1935　　　2 Sheets-Sheet 1
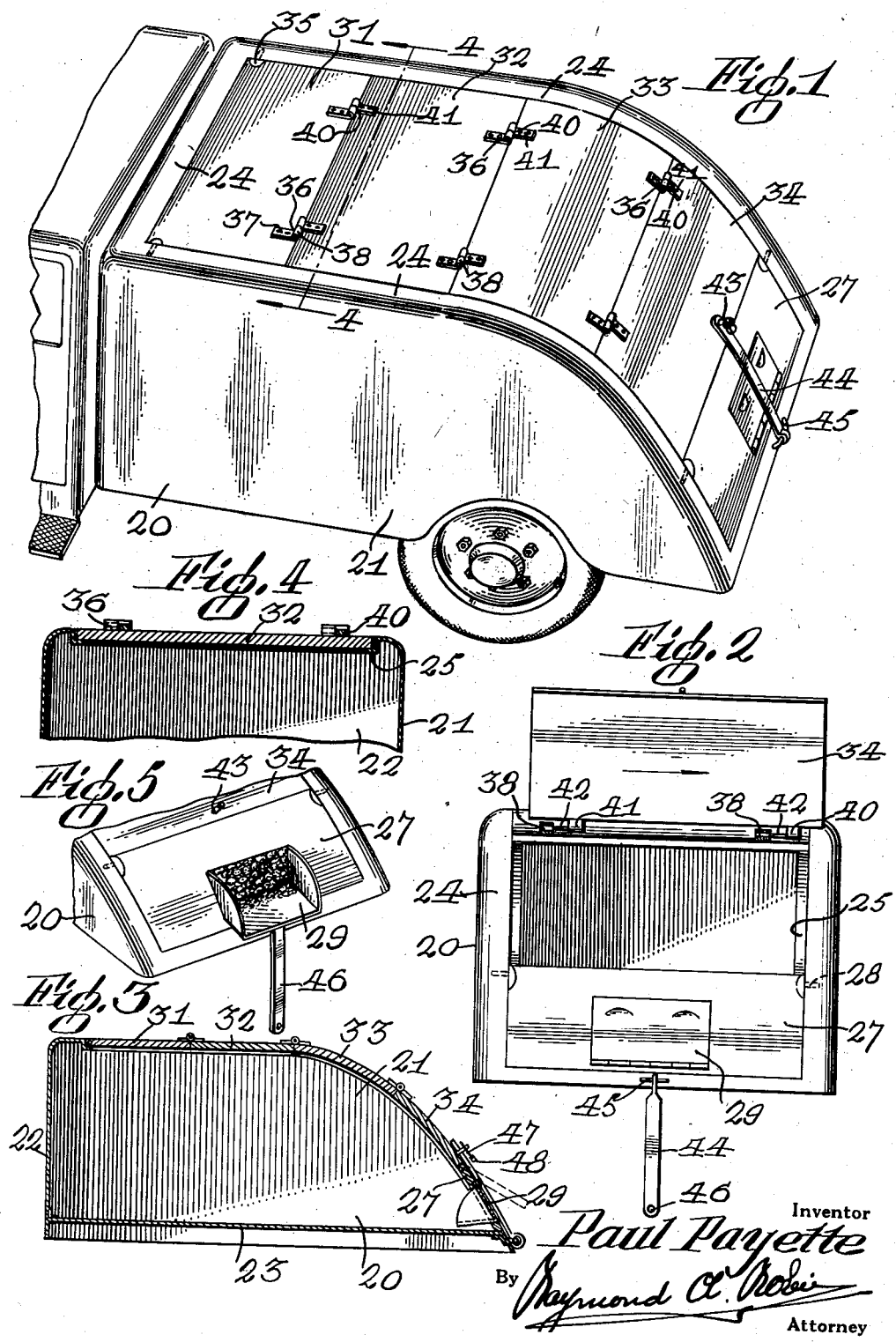

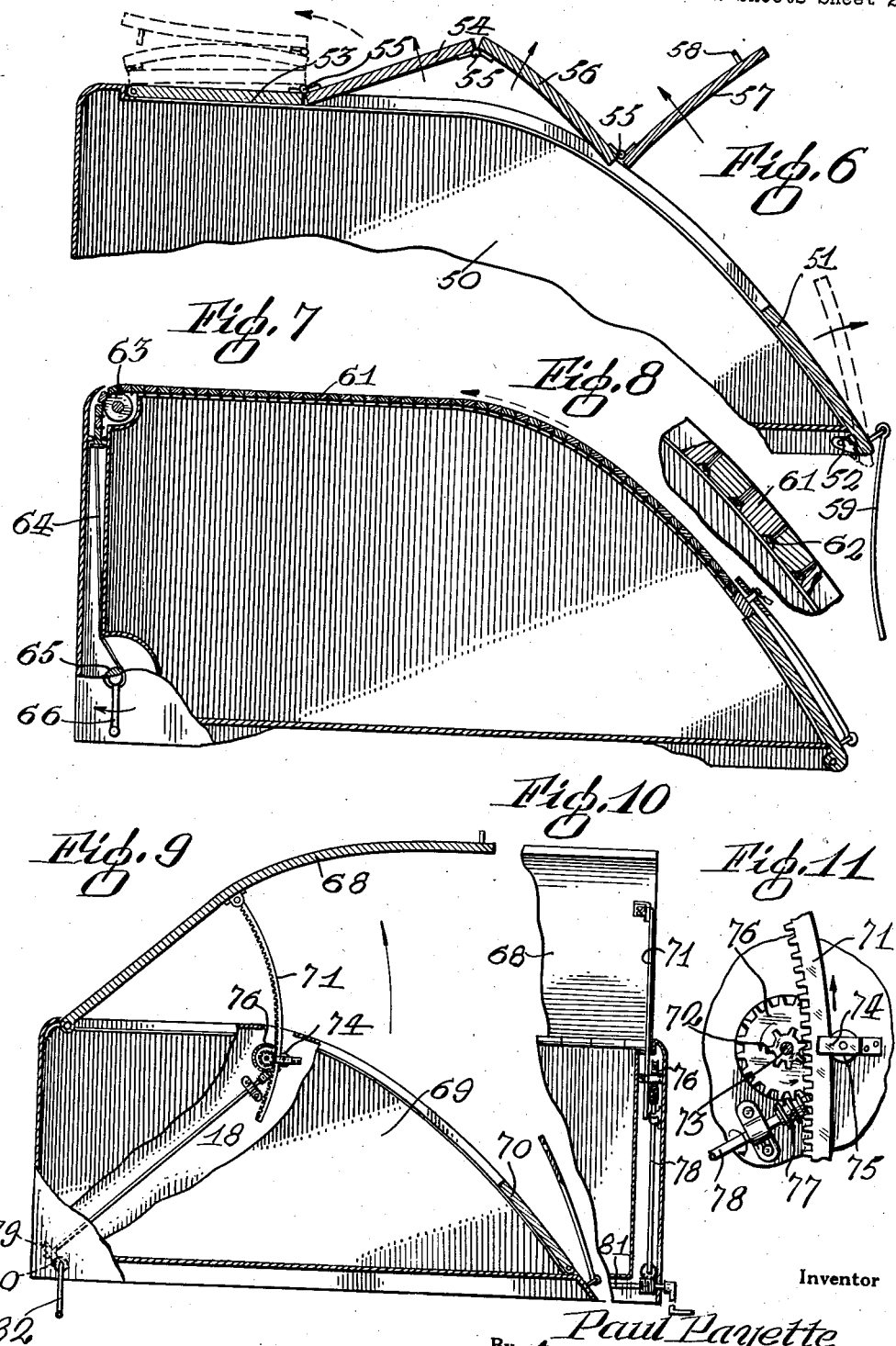

Patented July 6, 1937

2,086,091

UNITED STATES PATENT OFFICE 2,086,091

VEHICLE BODY

Paul Payette, Outremont, near Montreal, Quebec, Canada

Application October 5, 1935, Serial No. 43,724

1 Claim. (Cl. 296—100)

The present invention relates to improvements in vehicle body construction.

An object of the invention is the provision of a vehicle body designed so as to enable complete closure and sealing thereof.

Another object of the invention is the provision of a vehicle body having a removable cover which may be fastened and sealed in closed position.

A further object of the invention is the provision of a vehicle body constructed so as to enable closure in such manner as to obviate tampering with the contents thereof during delivery.

Still another object of the invention is the provision of a vehicle body which may be fully closed and which may be readily opened to permit convenient removal of the contents.

A still further object of the invention is the provision of a vehicle body having a removable cover structure extending approximately the full length of the body.

Still another object of the invention is the provision of a vehicle body of the aforesaid character which is relatively simple and durable in construction.

Other objects and advantages of the invention will become apparent as the description progresses.

In the accompanying drawings forming a part of this specification and in which like reference characters are employed to designate corresponding parts throughout the same:—

Figure 1 is a fragmentary perspective view of a vehicle disclosing the preferred form of body structure thereon, Figure 2 is a rear end view of the body with the cover in a partly open position, Figure 3 is a vertical longitudinal section through the body, Figure 4 is a fragmentary transverse section taken on the line 4—4 of Figure 1, Figure 5 is a fragmentary perspective view of the rear end body with the discharge door in open arrangement, Figure 6 is a fragmentary longitudinal section through a modified form of body cover construction, Figure 7 is a longitudinal section through another modified form of the body cover structure, Figure 8 is an enlarged fragmentary section through the cover shown at Figure 7, Figure 9 is a longitudinal section showing another form of cover construction, Figure 10 is a fragmentary end view of the same, partly in section, and Figure 11 is an enlarged fragmentary elevation of mechanism for operating the cover structure indicated in the two preceding figures.

Referring to Figures 1 to 5 inclusive, wherein is illustrated a preferred embodiment of the body, 20 generally designates the body structure which may constitute a metallic shell embodying vertical side walls 21, a vertical front wall 22 and a bottom 23. As illustrated at Figures 1 and 3, the side walls 21 are formed with a curved downward slope at the rear so that the rear end of the body has a diminishing taper toward the bottom rear end.

The top of the front wall 22 and the side walls 21 are formed with relatively narrow inwardly extending marginal rim portions 24 shaped at the inner edge to form a cover receiving groove. In the present instance, the groove is provided by an angular structure at the inner edge of the rim 24, providing a downwardly offset cover supporting lip 25.

Pivotally connected to the rear end portion of the body 20 so as to cover a portion of the top opening is an end gate 27 attached to the body by pivot pins 28 so that the gate may be swung outwardly and upwardly to discharge contents from the interior of the body. The end gate 27 is also preferably provided with a rectangular central opening in which is hingedly mounted a discharge door 29 which is capable of being swung outwardly, as shown at Figure 5, to enable restricted discharge of the body contents.

In the groove of the marginal top rim 24 is adapted to be mounted a removable cover structure, in the present instance embodying four sections 31, 32, 33 and 34. The sections 31 to 34 are elongated transversely and are formed so as to assume an approximately flush fit on the cover rim in closed arrangement, as shown at Figures 3 and 4. The cover section 31 is pivotally connected to the body by means of pivot pins 35 connecting the forward end thereof with the side rim structure of the body. At the rear edge of the forward cover section 31 are attached a pair of knuckle elements 36, each embodying a strap portion 37 adapted to be secured upon the section by screws or other suitable fastening elements and an eye 38 disposed at the rear edge of the section.

The knuckle joints 36 in the cover section 31 are engageable with pivot connections 40 on the forward edge of the adjacent cover section 32, these pivot connections embodying a fastening strap 41 secured to the cover section formed at the outer end with a knob on which is formed a transversely extending pivot pin 42 slidably and pivotally engageable with the eye 38 on each knuckle. The knuckles 36 are also attached to the rear edge of the section 32 and are engageable with corresponding pivot connections 40 on the front edge of the intermediate curved cover section 33. This section 33 likewise carries knuckle sections 36 at the rear edge engageable with pivot sections 40 on the forward edge of the rearmost cover section 34. This latter section carries an outwardly projecting fastening pin 43 on the outer side disposed centrally of the section adjacent the rear edge.

A fastening bar 44 is pivotally connected to an eye 45 at the rear edge of the body. This bar may be swung upwardly across the end gate and is provided at the free end with an aperture 46 adapted to clear the pin 43 to fasten the cover. When the bar is in fastening position a wire 47 is looped through an aperture in the outer end of the pin 43 and the ends of the loop are secured by a seal 48, preferably a metallic sealing disc.

When the fastening bar 44 engages the pin 43 and the sealing loop is disposed in the end of the pin, the body cover is securely fastened inasmuch as the bar extends over the end gate to prevent outward swinging movement thereof and likewise prevents opening movement of the discharge door 29 and obviates opening movement of the rear cover section 34 and consequently the remaining sections. When it is desired to remove the body cover, the sealed loop is readily broken and the bar swung rearwardly and downwardly to disengage the fastening pin 43. The discharge door 29 may be swung to an open position, as shown at Figure 5, and the end gate may be swung upwardly to the position shown in dotted lines at Figure 3. The sectional cover is removed by initially swinging the cover section 34 upwardly and, when in a raised position disengaged from the cover supporting grooves in the body top, may be moved laterally of the body to disengage the pivot pins 42 from the eyes of the knuckle connection so that the cover sections 32, 33 and 34 may be successively detached from one another and from the body. The forward cover section 31 may be swung upwardly and forwardly to provide an approximately full length opening in the top of the body.

In the modified form of the body shown at Figure 6, the body structure 50 is similar to that of the preferred form and is provided at the rear end with an end gate 51 pivoted by brackets 52 at the bottom to enable outward and downward swinging movement of the gate. The cover embodies a front section 53 pivotally connected to the bottom at the forward edge. To the rear edge of the section 53 is connected a section 54 attached to the front section by hinges 55. A third section 56 is connected by hinges 55 in edge to edge relation with the section 54, while a rear end section 57 is connected by hinges 55 to the third section. This cover structure is also fastened by a pin 58 on the rear section 57 engageable with a fastening bar 59 pivotally connected to the rear end of the body. When it is desired to open the truck, the cover sections 53 to 57 inclusive are disposed in folded arrangement, as shown in dotted lines in Fig. 6.

Another modified form of body cover, shown at Figures 7 and 8, embodies a roll-cover constituting a plurality of transversely extending slats 61 secured in edge to edge relation by hinges 62, forming a flexible cover construction. During movement the cover slats 61 pass over a guide roller 63 mounted transversely in a tubular compartment in the upper forward end of the body. The rear end of the cover slats are connected, by means of a cable 64, with a winding roller 65 in the bottom forward portion of the body so that, to open the cover, the roller 65 is rotated by means of a crank 66 and the hingedly connected cover slats are rolled upon the roller 65.

Still another modification of the body cover construction, shown at Figures 9 to 11 inclusive, embodies a rigid single piece cover 68 having the front end pivotally connected with the upper forward part of the body 69 and disposed to extend from the upper forward end of the body to a pivoted end gate 70 at the rear thereof.

A curved rack or segment 71, having the upper end pivotally connected to the margin at each side of the cover 68, is disposed in mesh with a spur pinion 72 secured on a transversely supported shaft 73. The rack 71 is suitably held in engagement with the pinion by means of a guide bracket 74 and a roller 75. Upon the shaft 73 is also secured a worm wheel 76 in mesh with a worm 77 secured on the upper end of a shaft 78 journalled obliquely in a side compartment in the body. On the lower rear end of the shaft is secured a worm wheel 79 in mesh with a worm 80 secured at the end of a shaft 81 journalled transversely in the bottom corner of the body and rotatable by a crank 82. Thus, the cover 68 may be readily elevated to an open position or lowered to closing arrangement by the operation of the hand crank 82 through the medium of the cover swinging gear mechanism.

It is to be understood that the forms of my invention herein shown and described are to be taken as preferred examples of the same and that various changes as to the shape, size and arrangement of parts may be resorted to without departing from the spirit of the invention or the scope of the subjoined claim.

Having thus described my invention, I claim:—

A vehicle body comprising an elongated body structure formed of parallel side walls having inwardly channelled upper edges, an end gate pivotally connected with the walls at the rear of the body, cover sections fitted between the channelled edges of the walls, means for pivotally securing the forward section permanently to the walls, hinges on adjoining edges of said sections separable by a lateral movement of one section with respect to the other, a hook secured to the rearward edge of the rear cover section, a lever pivoted to the body below the end gate and adapted to be sealably secured to the hook of the rear section, whereby to hold the cover sections in their recess and prevent opening of the end gate.

PAUL PAYETTE.